United States Patent [19]
Leenhouts et al.

[11] Patent Number: 5,883,686
[45] Date of Patent: Mar. 16, 1999

[54] LIQUID CRYSTAL DISPLAY DEVICE

[75] Inventors: Frans Leenhouts; Peter B.A. Wolfs, both of Eindhoven, Netherlands

[73] Assignee: Flat Panel Display Co. (FDP) B. V., Netherlands

[21] Appl. No.: 576,541

[22] Filed: Dec. 21, 1995

[30]     Foreign Application Priority Data

Jan. 13, 1995 [EP]  European Pat. Off. .............. 95200075

[51] Int. Cl.$^6$ ....................................................... G02F 1/13
[52] U.S. Cl. ............................................................. 349/177
[58] Field of Search ............................................. 349/177

[56]         References Cited

U.S. PATENT DOCUMENTS 5,159,325  10/1992  Kuijk et al. ............................. 340/783
  5,184,236   2/1993  Miyashita et al. ........................ 359/63
  5,237,438   8/1993  Miyashita et al. ...................... 349/119
  5,377,028  12/1994  Yoshida et al. ......................... 349/117

FOREIGN PATENT DOCUMENTS 0 259 822  3/1988  European Pat. Off. ............... 349/177

*Primary Examiner*—William L. Sikes
*Assistant Examiner*—James A. Dudek
*Attorney, Agent, or Firm*—David R. Treacy

[57]            ABSTRACT

The invention provides active-matrix display devices with non-linear two-pole switching elements such as MIMs or three-pole switching elements such as TFTs having a smaller difference in charge current at a different image content by using a suitable.

$$\left( \frac{\Delta \epsilon}{\epsilon_\perp} \right).$$

This leads to less burn-in of the image to be displayed. Moreover, a satisfactory transmission characteristic is obtained at a higher value of $\epsilon_\perp$. For TFTs it is then possible to use smaller auxiliary capacitances due to the higher values of $(\epsilon_\perp)$. The latter aspect may in turn be utilized to realise a larger aperture.

16 Claims, 2 Drawing Sheets

LIQUID CRYSTAL DISPLAY DEVICE

BACKGROUND OF THE INVENTION

The invention relates to a liquid crystal display device comprising a matrix of pixels arranged in rows and columns, a group of row electrodes and a group of column electrodes for driving the pixels, each pixel comprising a display element defined by picture electrodes, which element comprises a layer of liquid crystal material between the picture electrodes and is connected to a row or column electrode via a switching element.

In this application, a switching element is understood to mean both a two-pole and a three-pole switching element. Examples of two-pole switching elements are nonlinear switching elements such MIMs, diodes or varistors, but linear switching elements are not excluded. Examples of three-pole switching elements are TFTs.

Said display devices are used, for example in television applications and datagraphic display devices.

Display devices of the type described in the opening paragraph are generally known. A display device using two-pole switching elements (MIMs) is known, for example from U.S. Pat. No. 5,159,325. This Patent describes such a device with drive means which are adapted in such a way that a uniform image is obtained.

Notably if a twisted-nematic liquid crystalline material is used and a MIM (metal-isolator-metal) is chosen for the switching element, the burn-in phenomenon occurs (image retention). Dark characters against a light background, e.g. in datagraphic applications, then remain visible after selection of the characters.

SUMMARY OF THE INVENTION

It is, inter alia an object of the invention to provide a display device in which the burn-in phenomenon is suppressed.

To this end, a liquid crystal display device according to the invention is characterized in that the quotient of the dielectric anisotropy ($\Delta\epsilon$) of the liquid crystal material and the dielectric constant in the direction perpendicular to the directors of the liquid crystal material ($\epsilon_\perp$) has a value $$\left(\frac{\Delta\epsilon}{\epsilon_\perp}\right)$$

of between 0.8 and 1.8.

Preferably, $$\left(\frac{\Delta\epsilon}{\epsilon_\perp}\right)$$

is chosen to be larger than 1 and smaller than 1.5.

The invention is based on the recognition that, for a slight dielectric anisotropy, the difference in capacitance to be charged for dark and light pixels is smaller, so that the charge current in the switching elements varies to a smaller extent as a function of the information to be displayed. A smaller difference in charge current leads to less burn-in of the image to be displayed and to less differential drift.

By choosing the quotient $$\left(\frac{\Delta\epsilon}{\epsilon_\perp}\right)$$

between said values, it is also achieved that image retention and flicker are reduced. Also, (vertical) crosstalk is reduced notably if higher values are chosen for $\epsilon_\perp$. The value of $\epsilon_\perp$ is chosen to be, for example larger than 3.2 and preferably larger than 3.4.

The measures are particularly suitable for use in active-matrix display devices using non-linear two-pole switching elements such as MIMs, but also in active-matrix display devices using non-linear three-pole switching elements such as TFTs. In the latter case, notably when using auxiliary capacitances, smaller auxiliary capacitances can be used due to the usually higher values of ($\epsilon_\perp$). The latter aspect may then in turn be utilized for realising a larger aperture.

BRIEF DESCRIPTION OF THE DRAWINGS

These and other aspects of the invention will be apparent from and elucidated with reference to the embodiments described hereinafter.

In the drawings:

FIG. 2 shows transmission/voltage curves for a display device according to the invention and for a known display device, while

DETAILED DESCRIPTION OF THE PREFERRED EMBODIMENTS

Figure 1:
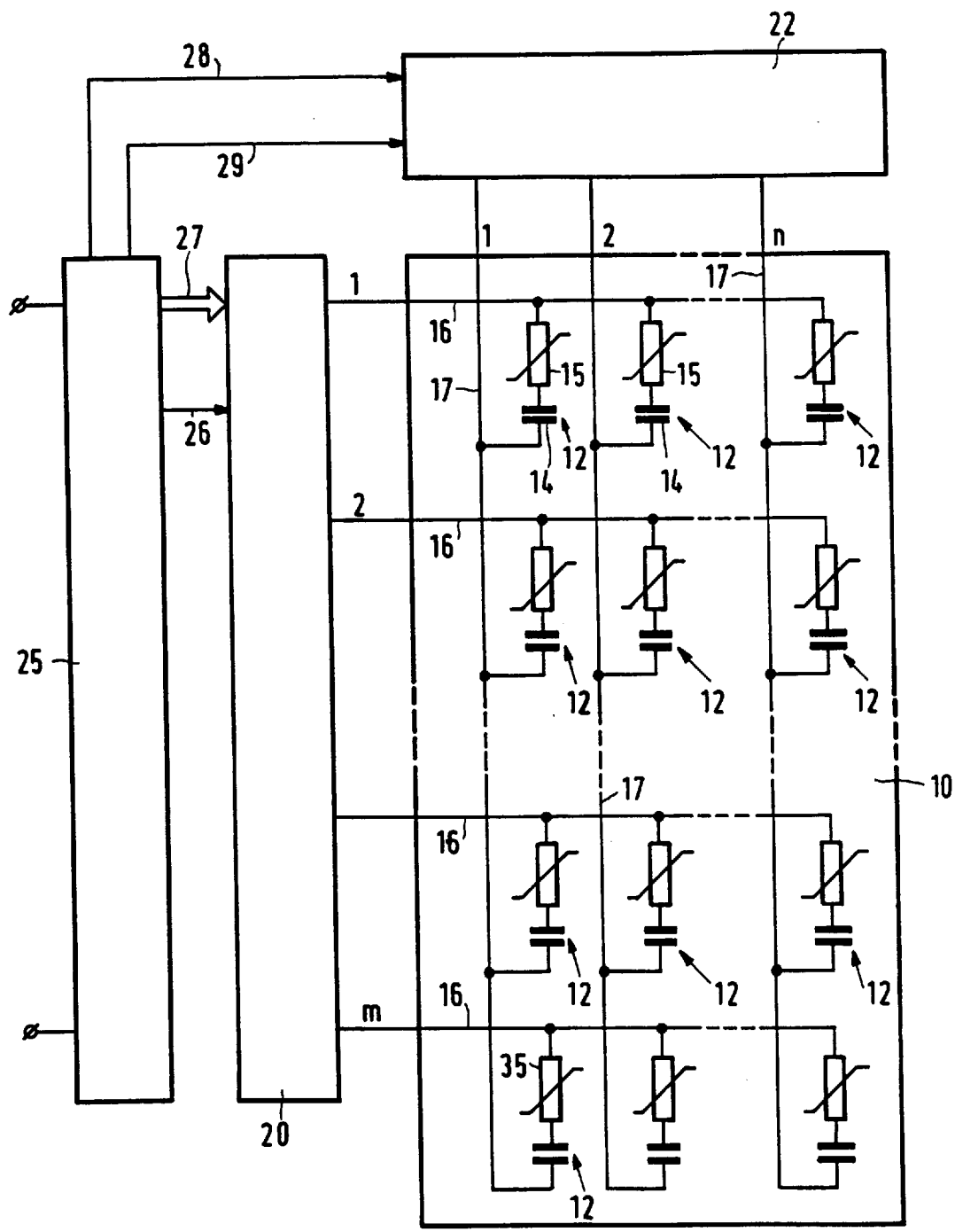
FIG. 1 diagrammatically shows a display device according to the invention.

FIG. 1 shows a display device for displaying information, for example video images, which device comprises an active-matrix liquid crystal display panel 10 comprising m rows (1 to m) with n pixels (1 to n) in each row. In this example, each pixel 12 consists of a twisted-nematic liquid crystal display element 14 which is electrically connected in series with a non-linear two-pole switching element 15 (in this example, a metal-isolator-metal element or MIM) operating as a switching element, the liquid crystal display element and the switching element being arranged between a row or selection conductor 16 and a column or data conductor 17. The pixels 12 are driven via the row and column conductors which are arranged on facing sides located opposite each other of two substrates (not shown) of, for example glass, on which the facing electrodes of the pixels are also provided. The switching elements 15 are present on the same substrate as the group of row electrodes or row conductors 16.

The row conductors 16 are successively selected by means of a row drive circuit 20, while data signals are simultaneously presented to the column conductors or column electrodes via a column drive circuit 22. These drive circuits are in turn controlled by a control circuit 25 in which also the timing is controlled. Timing signals and signals defining the voltages of the selection signals are applied from the control circuit 25 to the row drive circuit 20 via lines 26 and 27, respectively. Signals which define the voltages of the data signals (video signals) are applied from the control circuit 25 to the column drive circuit 22 via one or more lines 28, while timing signals are applied in synchronization with those for the row selection via one or more lines 29.

The effective dielectric constant of the liquid crystal material and consequently the pixel capacitance may vary between a minimum capacitance $C_{min}=\epsilon_0 \cdot \epsilon_\perp \cdot A/d$ at the threshold voltage $V_{th}$ and $C_{max}=\epsilon_0 \cdot \epsilon_\parallel \cdot A/d$ at the saturation voltage $V_{sat}$, in which A and d are the surface of the pixel and the thickness of the liquid crystal layer, respectively, while $\epsilon_\perp$ and $\epsilon_\parallel$ represent the "perpendicular" and "parallel" dielectric constant of the liquid crystal (mixture). The maximum difference in pixel capacitance between two pixels (display elements) then is $\Delta C = C(V_{sat}) - C(V_{th}) = \Delta\epsilon \cdot A/d$. A decrease of $\Delta\epsilon$ thus leads to a decrease of the difference in charge current and hence to a smaller variation of the properties of the switching elements due to current passage through these elements (reduction of the differential drift).

On the other hand, this decrease leads to an increase of the threshold voltage because $V_{th}$ is proportional to $(\Delta\epsilon)^{1/2}$ and hence disproportionally high drive voltages. It has been surprisingly found that this can be prevented by choosing the composition of the mixtures in a suitable manner (in accordance with the above-mentioned criteria with respect to $$\left( \frac{\Delta\epsilon}{\epsilon_\perp} \right).$$

Figure 2:
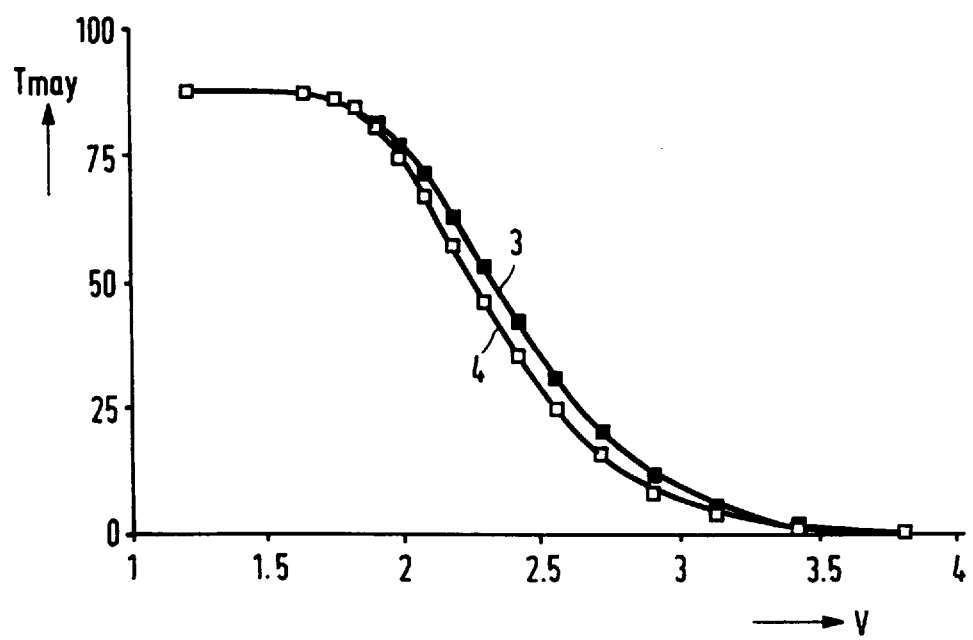

FIG. 2 shows the transmission/voltage characteristics for two mixtures having the following values of $\Delta n$, $\Delta\epsilon$ and $\epsilon_\perp$. For curve 3 (reference) it holds that $\Delta n=0.101$, $\Delta\epsilon=5.0$ and $\epsilon_\perp=3.1$, while for curve 4 (according to the invention) it holds that $\Delta n=0.101$, $\Delta\epsilon=3.8$ and $\epsilon_\perp=3.6$. The Figure shows that there is no or hardly any noticeable difference in threshold voltage. Moreover, approximately 20% less differential drift was found in a display device in which the second mixture was used, as compared with a display device in which the first mixture was used.

Figure 3:
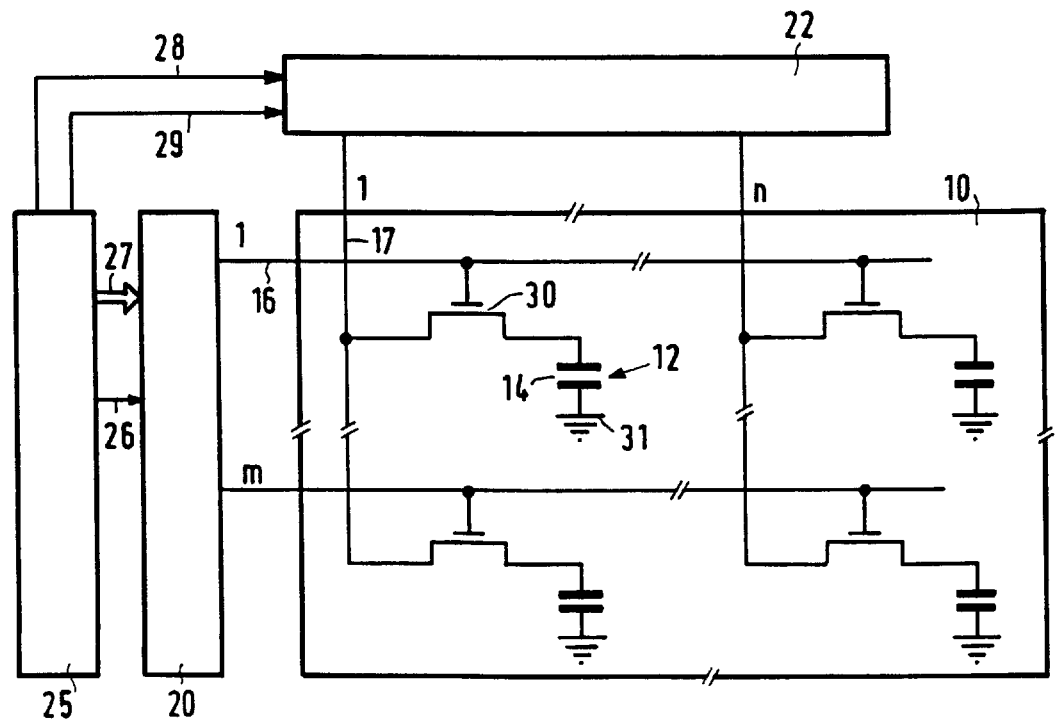
FIG. 3 shows diagrammatically a part of another display device according to the invention.

FIG. 3 shows another display device in which TFT transistors 30 are now used as switching elements. The row and column electrodes 16, 17 are now realised on the same substrate as the transistors, while the other substrate is provided with a counter electrode which is usually connected to a fixed voltage (for example to earth (31)). The other reference numerals in FIG. 3 have the same meaning as those in FIG. 1.

Since the liquid crystal (mixture) has a higher value of $\epsilon_\perp$ than the known mixtures, possible auxiliary capacitances (parallel to the display element) may be dispensed with or may be very small.

The value of $$\left( \frac{\Delta\epsilon}{\epsilon_\perp} \right)$$

is 1.05. In the active-matrix display devices shown, this value, which may vary between 0.8 and 1.8, leads to an improved behaviour as regards differential drift, image retention and flicker.

In summary, the invention provides active-matrix display devices with non-linear two-pole switching elements such as MIMs or three-pole switching elements such as TFTs with a smaller difference in charge current at a different picture content by using a suitable $$\left( \frac{\Delta\epsilon}{\epsilon_\perp} \right).$$

This leads to less burn-in of the picture to be displayed. Moreover, a satisfactory transmission characteristic is obtained at a higher value of $\epsilon_\perp$. For TFTs it is then possible to use smaller auxiliary capacitances due to the higher values of $(\epsilon_\perp)$. The latter aspect may in turn be utilized to realise a larger aperture.

What is claimed is:

1. A liquid crystal display device having suppressed image retention, comprising:
   a matrix of pixels arranged in rows and columns, each pixel comprising a display element defined by picture electrodes, and each element comprising a layer of liquid crystal material between the picture electrodes, and
   a group of row electrodes and a group of column electrodes for driving the pixels, each element being connected to a row or column electrodes through a switching element,
   wherein the dielectric anisotropy $\Delta\epsilon$ of the liquid crystal material is smaller than 7, the dielectric constant in the direction perpendiclar to the directors of the liquid crystal material $\epsilon\perp$ is larger than 3.1, and the dielectric anisotropy $\Delta\epsilon$ of the liquid crystal and the dielectric constant in the direction perpendicular to the directors of the liquid crystal material $\epsilon\perp$ have values such that the ratio $\Delta\epsilon/\epsilon\perp$ is in the range substantially between 0.8 and 1.8.

2. A device as claimed in claim 1, wherein the dielectric anisotropy $\Delta\epsilon$ of the liquid crystal material is smaller than 5.

3. A device as claimed in claim 1, wherein the switching elements are non-linear two-pole switching elements.

4. A device as claimed in claim 1, wherein the dielectric anisotropy $\Delta\epsilon$ of the liquid crystal material is smaller than 5.

5. A device as claimed in claim 4, wherein the dielectric constant in the direction perpendicular to the directors of the liquid crystal material ei is larger than 3.4.

6. A liquid crystal display device having suppressed image retention, comprising:
   a matrix of pixels arranged in rows and columns, each pixel comprising a display element defined by picture electrodes, and each element comprising a layer of liquid crystal material between the picture electrodes, and
   a group of row electrodes and a group of column electrodes for driving the pixels, each element being connected to a row or column electrodes through a switching element,
   wherein the dielectric anisotropy $\Delta\epsilon$ of the liquid crystal and the dielectric constant in the direction perpendicular to the directors of the liquid crystal material $\epsilon\perp$ have values such that the ratio $\Delta\epsilon/\epsilon\perp$ is in the range substantially between 0.8 and 1.8, the dielectric anisotropy $\Delta\epsilon$ of the liquid crystal material is smaller than 7, and the dielectric constant in the direction perpendicular to the directors of the liquid crystal material $\epsilon\perp$ is larger than 3.2.

7. A device as claimed in claim 6, wherein the dielectric constant in the direction perpendicular to the directors of the liquid crystal material $\epsilon_\perp$ is larger than 3.4.

8. A device as claimed in claim 6, wherein the switching elements are non-linear two-pole switching elements.

9. A device as claimed in claim 6, wherein the ratio $\Delta\epsilon/\epsilon\perp$ is smaller than 1.5.

10. A device as claimed in claim 6, wherein the ratio $\Delta\epsilon/\epsilon\perp$ is larger than 1.

11. A device as claimed in claim 10, wherein the dielectric anisotropy $\Delta\epsilon$ of the liquid crystal material is smaller than 5.

12. A device as claimed in claim 10, wherein the dielectric constant in the direction perpendicular to the directors of the liquid crystal material $\epsilon\perp$ is larger than 3.4.

13. A device as claimed in claim 10, wherein the ratio $\Delta\epsilon/\epsilon\perp$ is smaller than 1.5.

14. A device as claimed in claim 13, wherein the dielectric anisotropy $\Delta\epsilon$ of the liquid crystal material is smaller than 5.

15. A device as claimed in claim 13, wherein the dielectric constant in the direction perpendicular to the directors of the liquid crystal material $\epsilon\perp$ is larger than 3.4.

16. A device as claimed in claim 15, wherein the switching elements are non-linear two-pole switching elements.

* * * * *